(12) United States Patent
Efron et al.

(10) Patent No.: US 6,357,243 B1
(45) Date of Patent: Mar. 19, 2002

(54) REMOTE CONTROL SYSTEM FOR EVAPORATIVE COOLERS

(76) Inventors: Paul Efron, 3002 N. Jackson Ave., Tucson, AZ (US) 85719; Billy J Reynolds, 637 Quail St., Apt. A, San Diego, CA (US) 92102

( * ) Notice: Subject to any disclaimer, the term of this patent is extended or adjusted under 35 U.S.C. 154(b) by 0 days.

(21) Appl. No.: 09/655,309

(22) Filed: Sep. 5, 2000

Related U.S. Application Data

(63) Continuation-in-part of application No. 09/233,295, filed on Jan. 19, 1999, now abandoned.

(51) Int. Cl.[7] ............................. F28D 3/00; G05D 23/00
(52) U.S. Cl. ............................. 62/171; 62/179; 236/51
(58) Field of Search .................... 236/51, 171; 62/179, 62/171

(56) References Cited

U.S. PATENT DOCUMENTS

| | | | |
|---|---|---|---|
| 4,065,763 A | 12/1977 | Whyte | 340/310 R |
| 4,189,713 A | 2/1980 | Duffy | 340/168 R |
| 4,200,862 A | 4/1980 | Campbell | 340/310 A |
| 4,205,360 A | 5/1980 | Drucker | 361/68 |
| 4,232,531 A | 11/1980 | Mangum | 62/171 |
| 4,300,126 A | 11/1981 | Gajjar | 340/310 A |
| 4,377,754 A | 3/1983 | Thompson | 307/114 |
| 4,379,712 A | 4/1983 | Speer | 55/257 R |
| 4,560,972 A | 12/1985 | Britt | 337/338 |
| 4,580,403 A | 4/1986 | Hummel | 62/171 |
| 4,628,440 A | 12/1986 | Thompson | 364/140 |
| 4,638,299 A | 1/1987 | Campbell | 340/310 A |
| 4,673,028 A | 6/1987 | Meland | 165/19 |
| 4,746,897 A | 5/1988 | Shuey | 340/310 R |
| 4,775,100 A | 10/1988 | Gouldey | 236/46 R |
| 4,885,563 A | 12/1989 | Johnson | 340/310 A |
| 4,932,218 A | 6/1990 | Robbins | 62/171 |
| 5,005,187 A | 4/1991 | Thompson | 375/94 |
| 5,031,412 A | 7/1991 | Efron | 62/127 |
| 5,066,939 A | 11/1991 | Mansfield | 340/310 R |
| 5,224,353 A * | 7/1993 | Nagasawa | 62/209 |
| 5,224,648 A * | 7/1993 | Simon et al. | 236/51 |
| 5,475,360 A | 12/1995 | Guidette | 340/310.01 |
| 6,116,512 A * | 9/2000 | Dushane et al. | 236/51 |

* cited by examiner

Primary Examiner—William Wayner

(57) ABSTRACT

An electronic system for controlling an evaporative cooler (101) away from the location of a wall-mounted control switch (301). A remotely triggered high/low module (302) is installed in a roof-mounted electrical disconnect box (114). The existing wall-mounted manually operated control switch (117) is replaced with a new control switch (301) which contains a pump selection switch (304), a fan motor selection switch (305), and a remotely triggered on/off module (303). A variety of remote control devices can then be used to control the evaporative cooler (101), such as a PLC time-clock (501), an RF keychain remote (601) and PLC transceiver (701), a PLC thermostat (801), a PLC setback thermostat (901), a PLC telephone transponder (1001), or a computer interface (1101).

9 Claims, 7 Drawing Sheets

EVAPORATIVE COOLER WIRING SCHEMATIC
IN ACCORDANCE WITH INVENTION

EVAPORATIVE COOLER AND WIRING

EVAPORATIVE COOLER WIRING SCHEMATIC
IN ACCORDANCE WITH PRESENT INDUSTRY STANDARD

EVAPORATIVE COOLER WIRING SCHEMATIC
IN ACCORDANCE WITH INVENTION

NEW EVAPORATIVE COOLER CONTROL SWITCH

REMOTE TIME CLOCK

KEYCHAIN REMOTE CONTROL

REMOTE KEYCHAIN TRANSCEIVER

REMOTE THERMOSTAT

REMOTE SETBACK THERMOSTAT

TELEPHONE TRANSPONDER

COMPUTER INTERFACE

APPLIANCE MODULE WIRING
USED FOR HIGH/LOW MODULE AND ON/OFF MODULE

REMOTE CONTROL SYSTEM FOR EVAPORATIVE COOLERS

This application is a continuation in part of 09/233,295, filed Jan. 19, 1999 now abandoned.

CROSS REFERENCE TO RELATED APPLICATION

The present invention utilizes functions claimed in our previous U.S. Pat. No. 5,031,412, granted Jul. 16, 1991.

1. Field of Invention

This invention relates to evaporative coolers, specifically to a control system for evaporative coolers. Control devices are installed to allow a person to control the evaporative cooler away from the wall-mounted control switch.

2. Discussion of Prior-art

Evaporative Coolers

Evaporative coolers, also known as swamp coolers, are best suited to dry, desert climates, such as that found in the southwestern United States. Evaporative coolers generally comprise a generally cubic structure three to four feet (1 to 1.3 meters) in length, height, and width that is commonly mounted on the exterior of the roof of the building to be cooled. Three or four surfaces of the evaporative cooler comprise removable frames that contain pads made of shredded aspen wood or paper. The bottom of the evaporative cooler contains water to a depth that is controlled by a float to be about four inches (10 centimeters). The water is circulated by a water pump through distribution tubes to the tops of the pads to keep them wet. A blower fan centrally located within the evaporative cooler pulls dry outside air through the wet pads and into a duct distribution system located within the building. The power cords of the motor and pump protrude through the evaporative cooler housing and are plugged into a roof-mounted electrical disconnect box, commonly known as a Midwest box. Prevalently used to control the evaporative cooler, is a manually operated control switch. This switch is wall-mounted and allows the user to select a combination of water pump and blower fan settings. An exemplary prior-art evaporative cooler is described in U.S. Pat. No. 4,379,712 to Speer (1983).

Evaporative Coolers Versus Air Conditioners

Evaporative coolers differ significantly from refrigerated air conditioning units in a number of ways.

An air conditioner recirculates and tempers the air inside the building, while an evaporative cooler permits fresh outside air, cooled through wet pads, to enter the building and exit through open windows.

Air conditioners are cycled on and off during the course of the day and night by thermostats that control them, whereas prior-art evaporative coolers run continuously.

The User's Dilemma At Bedtime

One of the problems associated with prior-art evaporative coolers is the user's dilemma at bedtime. If the cooler is turned off before going to sleep, the inside air temperature of the building will most likely rise due to the heat stored in the building's walls and cause the occupants to become uncomfortable. Conversely, if the cooler is left on when going to sleep, the occupants will probably become too cold during the night, and have to get out of bed, go to the wall-mounted control switch, and shut off the cooler.

High Water Use

Another problem associated with prior-art evaporative coolers, is their high water usage, on the order of 15–20 gallons (55–75 liters) per hour. Shutting the evaporative cooler off when it is not needed or at times when the building is not occupied can result in significant savings of water and electrical energy. As an example, it has been estimated that approximately 10 billion gallons (40 gigaliters) per year are used in Tucson, Arizona in connection with the operation of residential evaporative coolers. This represents a major percentage of Arizona's water usage.

The prevalent system that controls evaporative coolers is a simple, six-position rotary control switch. This switch is wall-mounted and allows the user to select a combination of water pump and blower fan settings. This switch is manually operated and does not address nor solve the problem of high water usage of evaporative coolers. In the desert, water is precious, so the ability to control the operation of evaporative coolers would result in a significant savings of this precious natural resource.

Shutting off an evaporative cooler can cause a building to become hot and take a few hours to cool down after turning the cooler back on. Presently, it is common for occupants to run their evaporative cooler continuously to prevent having a hot house. Many of these people would gladly or even prefer to shut their cooler off during unneeded periods, if an appropriate controller was available to them. The controller would turn the cooler on and cool the building down before the occupants returned. Shutting evaporative coolers off during unneeded periods would save a significant amount of water and electrical energy.

Why thermostats Don't Work

There have been a number a attempts in the prior-art to solve the problem of controlling evaporative coolers through the use of thermostats. Exemplary prior-art is U.S. Pat. Nos. 4,232,531 to Mangum (1980), U.S. Pat. No. 4,560,972 to Britt (1985), U.S. Pat. No. 4,580,403 to Hummel (1986), U.S. Pat. No. 4,673,028 to Meland (1987), and U.S. Pat. No. 4,775,100 to Gouldey (1988). However, control of evaporative coolers is not effectively accomplished using temperature-responsive devices, for a number of reasons.

In order for an evaporative cooler to work properly, some windows in the building must be open in order to relieve air pressure created by the cooler. After the thermostat turns off the cooler, the open windows will permit hot outside air to enter the building thereby causing rapid cycling of the evaporative cooler and defeating the purpose of the thermostat.

Evaporative coolers do not recirculate and thereby mix the inside air. As a result, it is very difficult to position a thermostat for controlling an evaporative cooler in a location that will provide good temperature sensing. The above Pat. No. 4,560,972 to Britt describes a line voltage thermostat for controlling evaporative coolers. This device is intended to replace the conventional control switch. However, these control switches are generally in hallways or closets, which are unacceptable locations for sensing the inside air temperature.

Thermostat control results in cooling a building, whether or not it is occupied, thereby causing a waste of water and energy.

The line voltage thermostats described in the above Pat. No. 4,560,972 to Britt and U.S. Pat. No. 4,775,100 to Gouldey have a wide temperature range of plus or minus 20°

F. (11° C.) in order to prevent rapid cycling of the evaporative cooler due to open windows as described earlier. The use of these thermostats results in unpredictable cycling, and generally results in the evaporative cooler being turned on and off once every day.

Additional Wiring Required

A major problem in retrofitting an existing evaporative cooler control system is that the conventional systems have only four wires to the wall-mounted control switch and four wires to the roof-mounted electrical disconnect box. The wires to the control switch box are designated Hot, High motor, Low motor, and Pump. There is no neutral wire to the wall box, which would be needed to power a controller if it were to be mounted in place of the manual control switch. The wires to the electrical disconnect box are designated Neutral, High motor, Low motor, and Pump. There is no hot wire to the electrical disconnect box, which would be needed to power a controller if it were to be mounted in the electrical disconnect box. The above Pat. No. 4,580,403 to Hummel, U.S. Pat. No. 4,673,028 to Meland, and U.S. Pat. No. 4,932,218 to Robbins (1990) describe evaporative cooler controllers that require additional electrical wiring and constructional changes to buildings in which an evaporative cooler has been previously installed. These could require a difficult and expensive installation.

Power Line Carrier Technology

U.S. Pat. No. 4,200,862 to Campbell (1980) describes a system for controlling appliances from a master control panel that is plugged into any of the building's electric outlets. The appliance is plugged into a slave unit that is plugged into any of the building's electric outlets. The master control panel controls the slave unit and thereby the appliance, by transmitting electric signals through the building's power wires. This is commonly known today as power line carrier (PLC) technology.

The above Pat. No. 4,200,862 to Campbell was assigned to Pico Electronics Limited, whose parent company, X-10 Limited was very successful with this product. Today, X-10 sells an extensive PLC product line under the trademarks of Powerhouse and Activehome. There are other companies as well who sell PCL product lines, both X-10 compatible or using other technology standards.

Pico Electronics has several other PLC patents, specifically U.S. Pat. No. 4,189,713 to Duffy (1980), U.S. Pat. No. 4,377,754 to Thompson (1983), U.S. Pat. No. 4,628,440 to Thompson (1986), U.S. Pat. No. 4,638,299 to Campbell (1987), and U.S. Pat. No. 5,005,187 to Thompson (1991). Many other patents have been issued which further develop or utilize PLC technology, specifically U.S. Pat. No. 4,065,763 to Whyte (1977), U.S. Pat. No. 4,205,360 to Drucker (1980), U.S. Pat. No. 4,300,126 to Gajjar (1981), U.S. Pat. No. 4,746,897 to Shuey (1988), U.S. Pat. No. 4,885,563 to Johnson (1989), U.S. Pat. No. 5,066,939 to Mansfield (1991), and U.S. Pat. No. 5,475,360 to Guidette (1995). None of these companies have developed a system to control evaporative coolers.

Objects and Advantages

It is accordingly an object of the present invention to provide a controller for evaporative coolers that:

(a) will replace the components of a conventional evaporative cooler control system,
(b) will not requiring the addition of any wires or any structural changes of the building,
(c) is easy to install,
(d) allows control of the evaporative cooler away from the location of the wall-mounted control switch,
(e) allows bedside control of the evaporative cooler,
(f) allows utilization of a variety of controllers at remote locations such as manual switches, time-clocks, thermostats, setback thermostats, telephone transponders, or computer interfaces,
(g) prevents high and low blower motor speeds from running simultaneously and
(h) allows manual control of the evaporative cooler in the event the remotely triggered modules fail and need replacement.

Further objects and advantages of the present invention will become apparent from a consideration of the drawings and ensuing description.

SUMMARY

This invention uses remote location signal transmission to trigger control devices mounted in an existing evaporative cooler control system. The design described in this specification utilizes power line carrier (PLC) technology, such as that developed by X-10 Limited. Other signal transmission systems, such as radio frequency, radar, infrared, visible light, or ultrasonic could be utilized equally as well.

A remotely triggered (high/low) module is installed in the roof-mounted electrical disconnect box. The existing wall-mounted manually operated control switch is replaced with a new control switch. The new control switch that is described in this specification contains two manual toggle type switches and a remotely triggered (on/off) module, but other configurations could be used as well.

PLC compatible devices can then be used to control the evaporative cooler. These devices include a time-clock. The time-clock plugs into any electrical outlet of the building and would resemble a standard digital alarm clock. The time-clock sends a PLC signal to the remotely triggered modules thereby controlling the evaporative cooler.

Another PLC compatible device is a keychain remote control and transceiver system. The transceiver plugs into any electrical outlet of the building. The keychain remote control resembles those commonly used for automobile security systems and door locks. The keychain remote control sends a radio frequency (RF) signal to the transceiver, which in turn sends a PLC signal to the remotely triggered modules thereby controlling the cooler.

Other PLC compatible devices include thermostats, telephone transponders and computer interfaces. These devices, like the time-clock, and keychain remote control and transceiver systems described above, can be plugged into any standard electrical outlet of the building, control the remotely triggered modules, and thereby control the cooler.

BRIEF DESCRIPTION OF DRAWING FIGURES

FIG. 1 is a pictorial diagram of a conventional roof-mounted evaporative cooling system shown in cutaway view. A roof-mounted weatherproof disconnect box with cover open is shown with motor and pump cords plugged into it. A wall-mounted control switch is also shown. The wiring below the disconnect box to the control switch and building circuit breaker and ductwork that is ordinarily located behind walls and plenums is shown dashed.

REFERENCE NUMERALS USED IN DRAWING FIGURES

Figure 1:
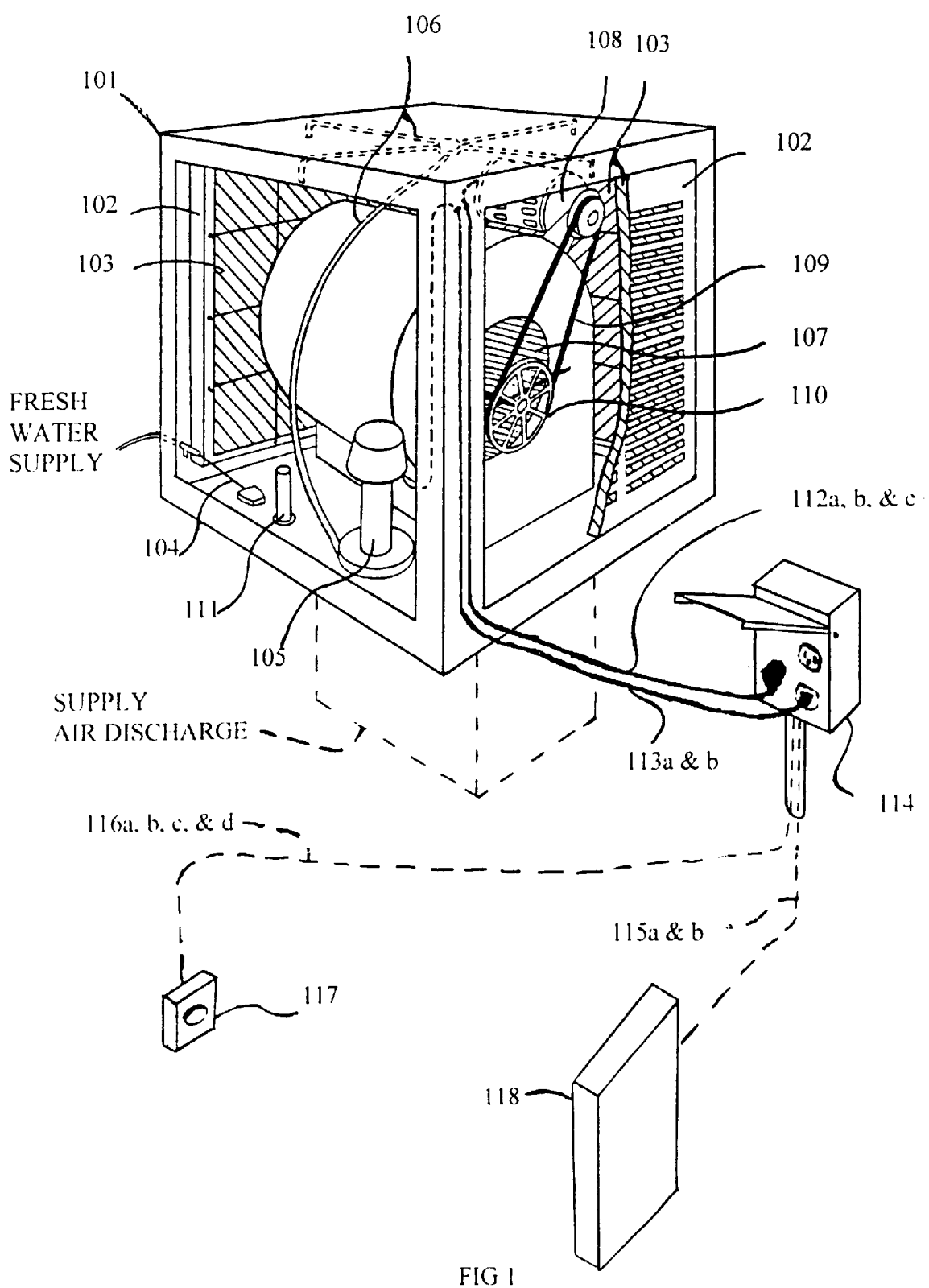

| Reference Numerals Used in Drawing Figures | |
|---|---|
| 101 | Evaporative Cooler |
| 102 | Removable Pad Frame |
| 103 | Pads |
| 104 | Water Float |
| 105 | Pump |
| 106 | Water Distribution Tubes |
| 107 | Blower Fan |
| 108 | Fan Motor |
| 109 | Belt |
| 110 | Pulley |
| 111 | Overflow Tube |
| 112a | Motor High Wire |
| 112b | Motor Common Wire |
| 112c | Motor Low Wire |
| 113a | Pump Power Wire |
| 113b | Pump Neutral Wire |
| 114 | Electrical Disconnect Box |
| 115a | Building Hot Wire |
| 115b | Building Neutral Wire |
| 116a | Switch Pump Wire |
| 116b | Switch Low Motor or Switch On/Off Wire |
| 116c | Switch High Motor or Switch Neutral Wire |
| 116d | Switch Hot Wire |
| 117 | Manual Control Switch |
| 118 | Building Circuit Breaker Box |
| 201 | Rotary Switch Knob |
| 202a | Motor High Fuse |
| 202b | Motor Low Fuse |
| 202c | Pump Fuse |
| 203 | Motor Outlet |
| 204 | Pump Outlet |
| 205 | Additional Power Outlet |
| 301 | New Control Switch |
| 302 | High/Low Module |
| 303 | On/Off Module |
| 304 | Pump Selection Switch |
| 305 | Fan Motor Selection Switch |
| 306 | Standard Electrical Outlet |
| 307 | Building's Electrical Wiring |
| 501 | Remote Time-Clock |
| 502 | Clock Display |

-continued

| Reference Numerals Used in Drawing Figures | |
|---|---|
| 503 | Function Buttons |
| 504 | Electric Plug |
| 601 | Keychain Remote Control |
| 602a | Remote On Button |
| 602b | Remote Off Button |
| 602c | Remote High Button |
| 602d | Remote Low Button |
| 701 | Keychain Remote Transceiver |
| 702 | Electric Plug Tabs |
| 703 | Antenna |
| 801 | Remote Thermostat |
| 802 | Display |
| 803 | Function Buttons |
| 804 | Electric Plug |
| 901 | Remote Setback Thermostat |
| 902 | Display |
| 903 | Function Buttons |
| 904 | Electric Plug |
| 1001 | Telephone Transponder |
| 1002 | Telephone Plug |
| 1003 | Function Buttons |
| 1004 | Electric Plug |
| 1101 | Computer Interface |
| 1102 | Computer Plug |
| 1103 | Electric Plug |
| 1201 | Module Control Section |
| 1202 | Module Relay Section |
| 1203 | Relay Hammer |
| 1204 | Relay Hammer Contact |
| 1205 | Relay Base Contact |
| 1206 | Additional Power Lead |

DETAILED DESCRIPTION OF THE PREFERRED EMBODIMENT

FIG. 1—Conventional Evaporative Cooling System

FIG. 1 shows a conventional evaporative cooler 101 that includes removable pad frames 102 on each of four side surfaces. Frames 102 hold pads 103 that are typically constructed of shredded aspen wood or paper. The bottom of evaporative cooler 101 comprises a tray that holds fresh water to a level of about 4 inches (10 centimeters), controlled by a water float 104. A water pump 105 circulates the water through a number of water distribution tubes 106 to the top of each of pads 103 to keep them wet. A centrally located blower fan 107 pulls outside air into cooler 101 through pads 103 and into an air duct distribution system within the building to be cooled. Fan motor 108, connected by means of belt 109 and pulley 110, powers blower fan 107. A removable overflow tube 111 is employed to drain water from cooler 101 to conduct normal maintenance and in the event of failure of float 104. Motor power cord 112 (a, b, & c), and pump power cord 113 (a & b) protrude through the housing of cooler 101 and are plugged into electrical disconnect box 114. Power is brought to disconnect box 114 from the building's circuit breaker box 118 by building wires 115 (a & b). A manually operated rotary control switch 117 employed to select various water pump and blower fan functions typically controls cooler 101. These functions are shown on the faceplate of manual control switch 117 in FIG. 2. Control switch 117 is wall-mounted and wired to disconnect box 114 by switch wires 116 (a, b, c, &d).

Figure 2:
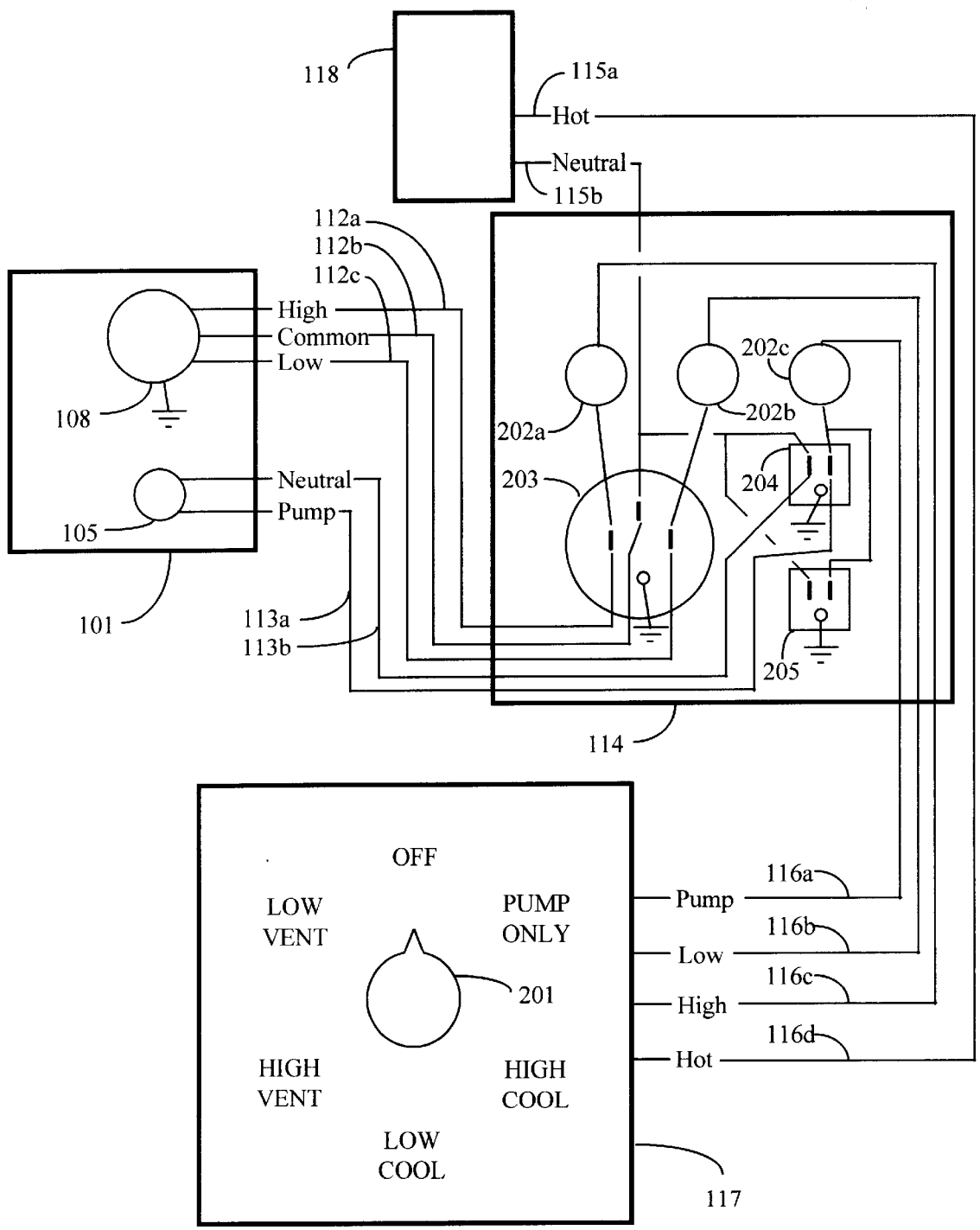
FIG. 2 is a wiring schematic diagram of the conventional evaporative cooling system depicted in FIG. 1. The manually operated control switch that is prevalently used is shown.

FIG. 2—Wiring Of Conventional Evaporative Cooling System

FIG. 2 is a wiring schematic diagram of the conventional evaporative cooling system depicted in FIG. 1. The building's circuit breaker box 118 powers control switch 117 through switch hot wire 116*d*. Control switch 117 is wired to motor outlet 203 and pump outlet 204 through motor high fuse 202*a*, motor low fuse 202*b*, and pump fuse 202*c* via switch high motor wire 116*c*, switch low motor wire 116*b*, switch pump wire 116*a*. Fan motor 108 plugs into motor outlet 203 of disconnect box 114 with a power cord consisting of motor high wire 112*a*, motor common wire 112*b*, and motor low wire 112*c*. Pump 105 plugs into pump outlet 204 of disconnect box 114 with a power cord consisting of pump hot wire 113*a* and pump neutral wire 113*b*. Electrical disconnect box 114 returns power to the building's circuit breaker box 118 through building neutral wire 115*b*.

Figure 3:
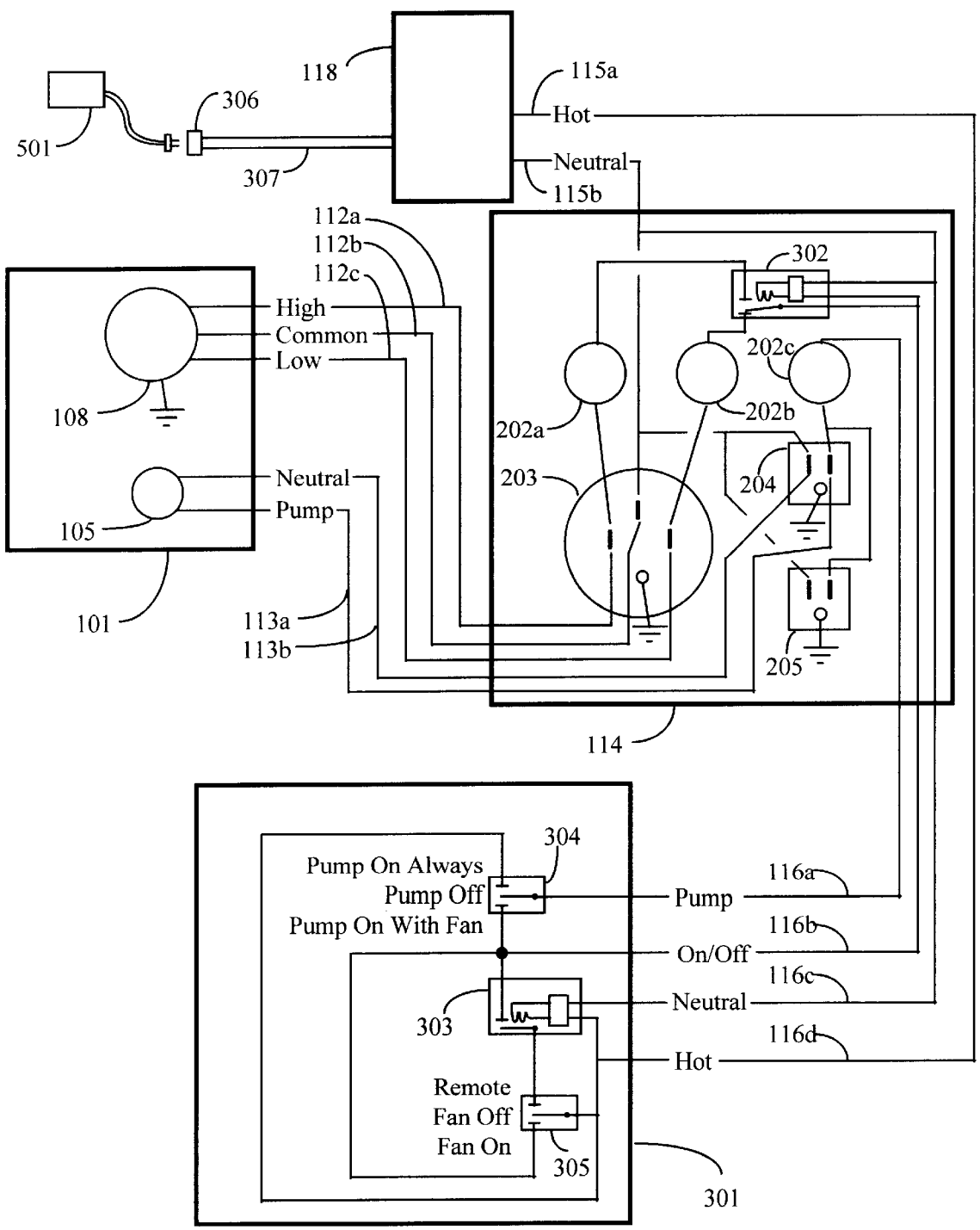
FIG. 3 is a wiring schematic diagram of the conventional evaporative cooling system depicted in FIGS. 1 & 2 with the modifications to the wiring, the addition of a remotely triggered module in a disconnect box, and a new control switch in accordance with the present invention.

FIG. 3—Wiring Of Conventional Evaporative Cooling System

In Accordance With Present Invention

FIG. 3 is a wiring schematic diagram of the conventional evaporative cooling system depicted in FIGS. 1 & 2 with modifications in accordance with the present invention.

A double-throw remotely triggered high/low module 302 is installed in disconnect box 114. High/low module 302 is wired to building neutral wire 115*b*, motor high fuse 202*a*, motor low fuse 202*b*, and switch low motor wire 116*b*. Switch low motor wire 116*b* is an existing wire mounted behind the walls of the building and runs between control switch 117 and disconnect box 114. After successful installation, switch low motor wire 116*b* will be referred to as switch on/off wire 116*b*, because it's function will change as part of the installation. Switch high motor wire 116*c*, like switch low motor wire 116*b*, is an existing wire whose function will change as part of the installation. After installation, switch high motor wire 116*c* will be referred to as switch neutral wire 116*c*, because it returns power from new control switch 301. Changing the function of switch low motor wire 116*b* to be used to power both high and low motor speeds, frees switch high motor wire 116*c* to be used as an electrical return path from new control switch 301. Changing the function of the existing wires is a critical concept, which is required in order to power the necessary control devices without requiring additional building wires. This concept has yet to be discovered as evidenced by the prior-art.

Figure 4:
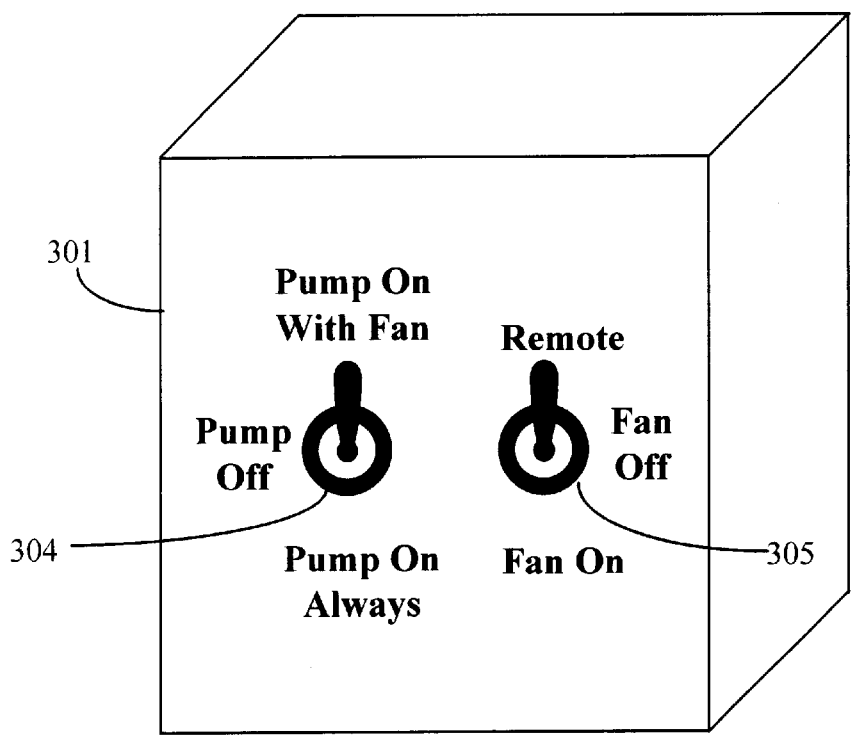
FIG. 4 shows the faceplate of a new control switch in accordance with the present invention.

A new control switch 301 directly replaces existing manual control switch 117. New control switch 301 consists of a faceplate, a remotely triggered on/off module 303, a pump selection switch 304, and a fan motor selection switch 305. The faceplate of new control switch 301 is shown as FIG. 4. On/off module 303 will turn fan motor 108 and pump 105 on and off through use of remote control devices based on the positions of high/low module 302, pump selection switch 304, and fan motor selection switch 305. During normal operation, the user would manually set pump selection switch 304 to PUMP ON WITH FAN and fan motor selection switch 305 to REMOTE. If the position of high/low module 302 was on low speed, and a remote control device triggers on/off module 303 and changes it from the off position to the on position, fan motor 108 would turn on low speed and pump 105 would turn on. When a remote control device triggers on/off module 303 again and changes it from the on position back to the off position, fan motor 108 and pump 105 would both turn off. If the position of high/low module 302 was on high speed, and a remote control device triggers on/off module 303 and changes it from the off position to the on position, fan motor 108 would turn on high speed and pump 105 would turn on. Pump selection switch 304 is a manually operated single-pole double-throw on-off-on toggle switch, but other types of switches could be used as well. Pump selection switch 304 allows the user to manually turn off pump 105, manually turn on pump 105, or to have pump 105 run concurrently with fan motor 108. Fan motor selection switch 305 is a single-pole double-throw on-off-on toggle switch, but other types of switches could be used as well. Fan motor selection switch 305 allows the user to manually turn off motor 108, manually turn on motor 108, or to have motor 108 controlled by remote control devices.

Remote Control Devices

After successful installation of new control switch 301 and high/low module 302, a variety of remote control devices can be used to control cooler 101. In this preferred embodiment, power line carrier PLC compatible devices, such as those developed by X-10 Limited, are described. These devices can turn cooler 101 on and off, or change between high speed and low speed by remotely triggering on/off module 303 or high/low module 302 from their respective open and closed positions.

X-10 Limited model AM466 appliance modules were used for on/off module 303 and high/low module 302. These AM466 appliance modules can be considered to have two sections, module control section 1201 and module relay section 1202. When the AM466 appliance module is connected to a power line, module control section 1201 will be listening for a PLC signal that was sent by a transmitter on the power line as described U.S. Pat. No. 4,200,862 to Campbell (1980). When the appropriate signal reaches the AM466 appliance module, it will act as what was referred to as a slave unit in the above Pat. No. 4,200,862 to Campbell, by recognizing the signal in module control section 1201, in turn energizing the coil in module relay section 1202. This actuates the relay by pivoting relay hammer 1203, whereby relay hammer contact 1204 will touch relay base contact 1205 completing the electrical circuit.

Unfortunately, the contacts of X-10 Limited AM466 appliance module are only sufficiently rated for the fan motors used in the smaller sized evaporative coolers, not for the fan motors used in the larger sized evaporative coolers. The AM466 appliance modules are also not available in a double-throw configuration. The AM466 appliance modules will either need to be modified or have them actuate a secondary double-throw relay with properly sized contacts.

To modify the AM466 appliance modules, relay hammer contacts 1204 and relay base contacts 1205 would be removed and replaced with different contacts. The material and size of the replacement contacts would be selected to enable the contacts to be electrically rated at a minimum, for the largest evaporative cooler fan motor size to be served. Large standard fan motor sizes for residential coolers are 3/4 and 1 horsepower.

An AM466 appliance module would be modified into a double-throw configuration to create high/low module 302. An additional appropriately rated relay hammer contact 1204 would be added to relay hammer 1203. An additional appropriately rated relay base contact 1205 and additional power lead 1206 would be added to module relay section 1202.

Figure 5:
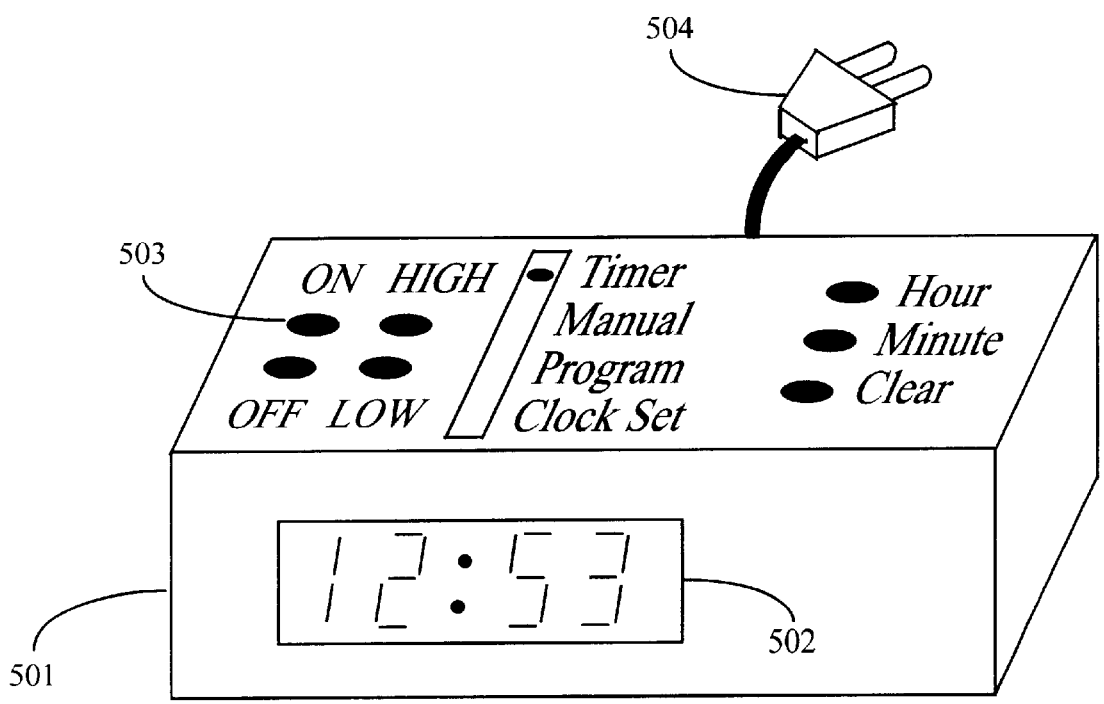
FIG. 5 shows a remote time-clock in accordance with the present invention. Function buttons shown on this and all FIGS. are diagrammatic only.

FIG. 5—Remote Time-Clock

FIG. 5 shows one such remote control device. A time-clock 501 can be used to control cooler 101. Time-clock 501 resembles a standard digital alarm clock and is plugged into any standard electrical outlet 306 of the building. By pressing its function buttons 503 or upon programmed times, time-clock 501 will send a PLC signal over the building's electrical wiring 307 acting as what was referred to as a transmitter in the above Pat. No. 4,200,862 to Campbell which triggers on/off module 303 or high/low module 302, as what was referred to as a slave unit in the above Pat. No. 4,200,862 to Campbell, thereby controlling cooler 101. The user can program time-clock 501 to have cooler 101 turn on and off, or switch between high and low speeds at predetermined times of their choosing.

After installation, on/off module 303 and high/low module 302 will be connected to the building electrical wiring 307. When time-clock 501 or any of the other remote control devices are plugged into an electrical outlet 306, they too will be connected to the same building electrical wiring 307. All of these devices can then transmit and receive small electrical control (PLC) signals between each other over the same electrical wiring 307 that power the lights and appliances of the building. On/off module 303 and high/low module 302 will be waiting or listening for these electrical control (PLC) signals. As an example, when the user presses one of the function buttons 503 to turn cooler 101 on or off or change the fan speed, time-clock 501 will send a small electrical control (PLC) signal over the building's power wires. On/off module 303 or high/low module 302, which are listening and waiting for these signals, will recognize the signal in module control section 1201, and actuate or release its own module relay section 1202, which closes or opens the electrical power circuit for fan motor 108.

PLC compatible time-clocks are produced by several companies and are readily available in the marketplace. Exemplary of such a device is Mini-Timer model MT522, as produced by X-10 Limited and marketed under their Powerhouse brand. They are however intended for different applications. They require as a minimum, modifications of the markings on the device and instructions for use with this application. It may be advantageous to produce a new PLC compatible time-clock specifically designed for these applications with the appropriate function buttons and markings.

Figure 6:
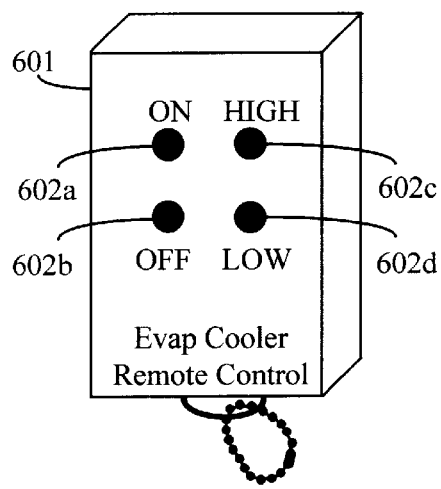
FIG. 6 shows a keychain remote control in accordance with the present invention.
Figure 7:
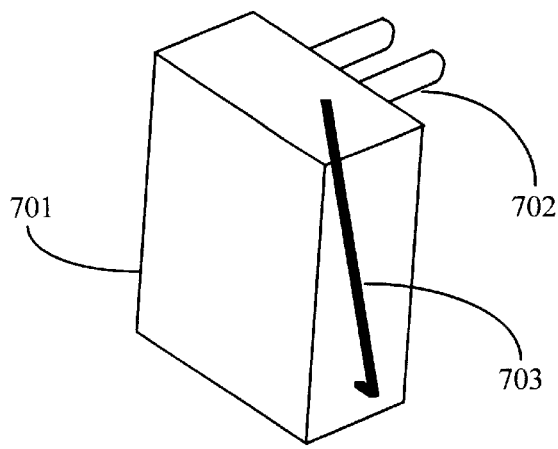
FIG. 7 shows a keychain remote transceiver in accordance with the present invention.

FIGS. 6 and 7—Keychain Remote Control and Transceiver

FIG. 6 shows another such remote control device. A keychain remote control 601 can be used in conjunction with a keychain remote transceiver 701 shown in FIG. 7. Keychain remote control 601 resembles those commonly used for automobile security systems and door locks. They work much in the same way that time-clock 501 works. Transceiver 701 is plugged into any standard electrical outlet 306 of the building and its antenna 703 is raised. By pressing keychain remote buttons 602a, b, c, or d, keychain remote control 601 will send a radio frequency (RF) signal to transceiver 701 which in turn sends PLC a signal over the building's electrical wiring 307 which in turn triggers on/off module 303 or high/low module 302, thereby controlling cooler 101.

Keychain remote control 601 and transceiver 701 are produced by several companies and are readily available in the marketplace. Exemplary of such devices are keychain remote model KC674 and transceiver model TM571 as produced by X-10 Limited and marketed under their Powerhouse brand. They are utilized in different applications as discussed in the prior-art section above. They would require as a minimum, modifications of the markings on the device and instructions for use with this application.

Figure 8:
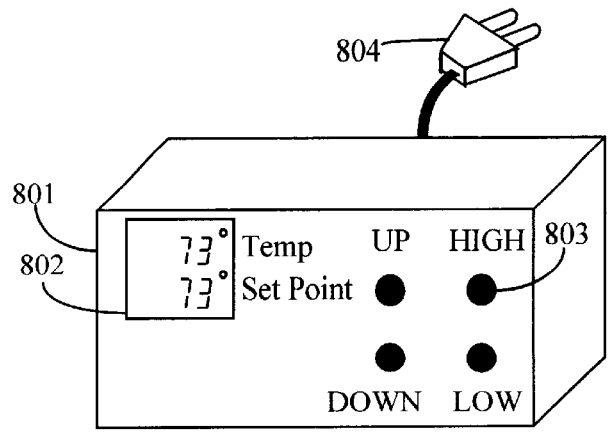
FIG. 8 shows a remote thermostat in accordance with the present invention.

FIG. 8—Remote Thermostat

FIG. 8 shows another such remote control device. A remote thermostat 801 can be used to control cooler 101. Like the other remote devices, thermostat 801 would be plugged into any building electrical outlet 306. It could be made to operate with a variety of control sequences. One control sequence would simply cycle motor 108 on and off based on the temperature and set point, with the motor speed remaining constant. A second control sequence would have motor 108 operate with two stages and step through off, low speed, and high speed based on the temperature and set point. Thermostat 108 could be contained at the outlet location or made to mount the sensing device at an appropriate height. It could be made with an electronic logic algorithm to prevent short cycling problems associated with evaporative cooler thermostats as discussed in the prior-art section above.

There are PLC compatible thermostats readily available in the market, however these are intended for air conditioning systems and would not be usable for evaporative coolers. A PLC compatible thermostat 801 would be developed to trigger on/off module 303 and high/low module 302, and thereby control cooler 101.

Figure 9:
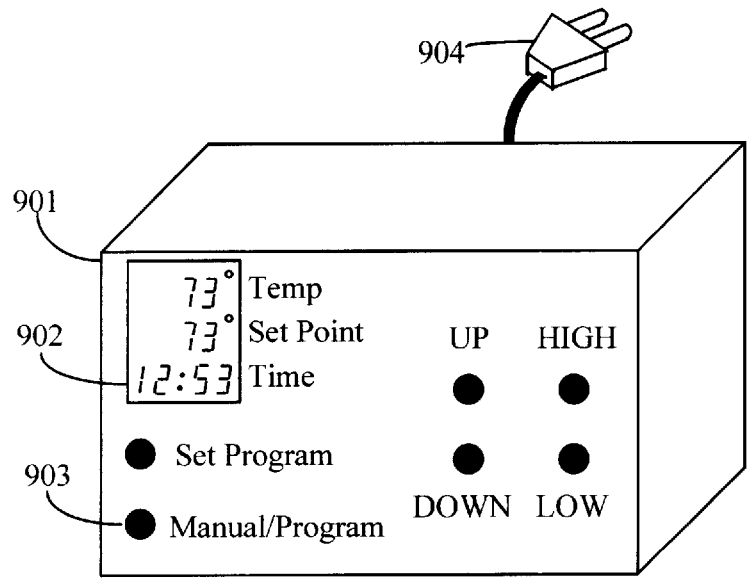
FIG. 9 shows a remote setback thermostat in accordance with the present invention.

FIG. 9—Remote Setback Thermostat

FIG. 9 shows another such remote control device. A remote setback thermostat 901 can be used to control cooler 101. Like the other remote devices, setback thermostat 901 would be plugged into any building electrical outlet 306. It would resemble thermostat 801 with the addition of time-of-day control and would function like a standard two stage air conditioning setback thermostat.

Figure 10:
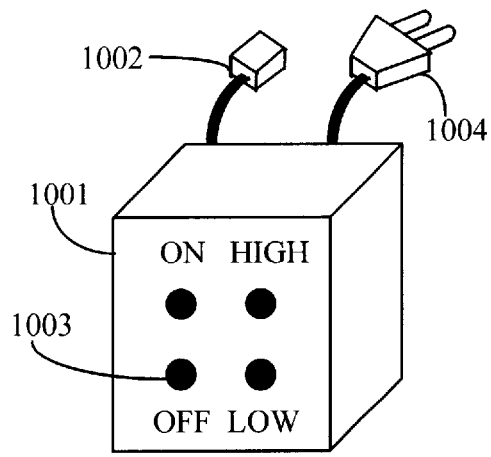
FIG. 10 shows a telephone transponder in accordance with the present invention.

FIG. 10—Telephone Transponder

FIG. 10 shows another such remote control device. A telephone transponder 1001 can be used to control cooler 101. Like the other remote devices, telephone transponder 1001 would be plugged into any building electrical outlet 306. It would also be plugged into any telephone outlet of the building. The user would make a telephone call to the building and transmit signals to transponder 1001 over the phone lines using the telephone keypad. Transponder 1001 would relay the signals to the control devices thereby controlling the cooler. This would operate much in the way some telephone answering machines allow message retrieval.

Telephone transponders are produced by several companies and are readily available in the marketplace. Exemplary of such a device is telephone transponder model TR551, produced by X-10 Limited and marketed under their Powerhouse brand.

Figure 11:
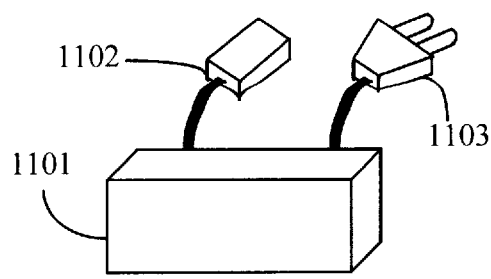
FIG. 11 shows a computer interface in accordance with the present invention.
Figure 12:
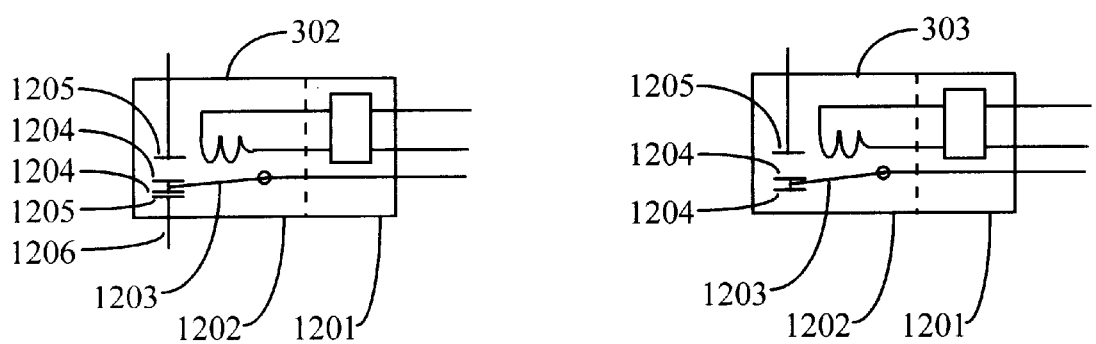
FIG. 12 shows the appliance module wiring used for the high/low and on/off modules.

FIG. 11—Computer Interface

FIG. 11 shows another such remote control device. A computer interface 1101 can be used to control cooler 101. Like the other remote devices, computer interface 1101 would be plugged into any building electrical outlet 306. It would also be plugged into the port of a computer. Through the use of appropriate software and programming, a computer would trigger the control devices and therefore control the cooler.

Computer interfaces are produced by several companies and are readily available in the marketplace. Exemplary of such a device is computer interface model CM11A, produced by X-10 Limited and marketed under their Activehome brand.

OPERATION

The user sets the switches on new control switch 301.

Pump Selection Switch 304

The user chooses the position of pump selection switch 304. The switch chosen for the preferred embodiment is a single-pole double-throw on-off-on toggle switch, but other types of switches could be used as well. The PUMP OFF position is chosen during those times when it is desirable to have the pads remain dry, to use the cooler as a fan only, or during those times when evaporative cooler 101 is shut down completely.

PUMP ON WITH FAN or PUMP ON ALWAYS positions are the normal settings chosen o during the cooling season. The user places pump switch 304 in one of these two positions where it would normally remain for the cooling season.

PUMP ON WITH FAN is chosen by those users that want to minimize the electricity bill. Pump 105 is then off when fan motor 108 is off, and pump 105 is on when fan motor 108 is on. In this position, pump 105 is utilized for a minimum amount of time.

PUMP ON ALWAYS is chosen by those who are less concerned with the electrical cost and are more interested with having cooler pads 103 wet and ready to use at all times. If pump 105 is turned on with fan motor 108 after pads 103 have dried out, untempered outdoor air will enter the building for roughly five minutes until pads 103 have had the opportunity to become wet. Not having cooler pads 103 wet and ready to use upon arrival to the building can be inconvenient. To prevent this, pump 105 is run continuously. Cooler pumps 105 are generally fractional horsepower (HP) pumps of about 1/70 HP. They draw about 0.7 amp, which would use about 60 kWh or $5 in a month if run continuously. Electrical savings for the entire cooling season is estimated at $8. This is in contrast to fan motors 108 which are generally ⅓, ½, ¾ or 1 HP and therefore the main percentage of electrical usage.

An additional benefit of running pump 105 continuously is the potential for less hard water calcium buildup on cooler 101 if cooler pads 103 are not allowed to dry out on a daily basis.

The option is available to those who feel that the benefits of continuously running pump 105 is worth the few extra dollars.

Fan Motor Selection Switch 305

The user chooses the position of fan motor selection switch 305. The switch chosen for the preferred embodiment is a single-pole double-throw on-off-on toggle switch, but other types of switches could be used as well. The FAN OFF position is chosen during those times when the fan is to remain off, such as during those times when cooler 101 is shut down completely.

The FAN ON position is used to turn the fan on manually. One consideration during the development of this system was that cooler 101 should be manually operable in the event of failure of the remotely triggered modules until repairs can be made. In the event that on/off module 303 fails in either the open or closed position, cooler 101 can be manually operated by setting fan switch 305 to FAN ON or FAN OFF.

Since the majority of relay failures leave the relay stuck in one position, if high/low module 302 fails it will probably fail in either the open or closed position, and therefore be stuck on either high speed or low speed. Cooler 101 will probably still be operable which allows to building to be cooled until repairs can be made.

During normal operation, fan switch 305 is set in the REMOTE position where it will remain for the cooling season. The user has a variety of ways to control cooler 101, depending upon which remote control devices they choose to operate.

Remote Time-Clock 501

The user of remote time-clock 501 would program the time-of-day for the cooler to turn on and off using function buttons 503. Once time-clock 501 is programmed, it will control cooler 101 accordingly. As an example, let's look at the typical use for the user that goes to sleep at 11:00 PM and returns home from work at 6:00 PM. Time-clock 501 is programmed to turn cooler 101 off at 1:30 AM, after they have gone to sleep and to turn cooler 101 on at 3:00 PM, a few hours before they return home. This allows the building to be comfortable when occupied and minimize the hours of usage and therefore minimize the electrical and water usage.

In this example, at 1:29 AM, cooler 101 would normally be on. At 1:30 AM, time-clock 501 will send a PLC signal over the building's electrical wiring 307 acting as what was referred to as a transmitter in the above Pat. No. 4,200,862 to Campbell. On/off module 303 will be listening for this PLC signal and will act as what was referred to as a slave unit in the above Pat. No. 4,200,862 to Campbell, by recognizing the signal in module control section 1201, in turn de-energizing the coil in module relay section 1202. This releases the relay by pivoting relay hammer 1203, whereby relay hammer contact 1204 will no longer touch relay base contact 1205 breaking the electrical circuit, de-energizing fan motor 108 and effectively turning cooler 101 off.

In this example, at 2:59 PM cooler 101 would normally be off. At 3:00 PM, time-clock 501 will send a PLC signal over the building's electrical wiring acting as what was referred to as a transmitter in the above Pat. No. 4,200.862 to Campbell. On/off module 303 will be listening for this PLC signal and will act as what was referred to as a slave unit in the above Pat. No. 4,200.862 to Campbell, by recognizing the signal in module control section 1201, in turn energizing the coil in module relay section 1202. This actuates the relay by pivoting relay hammer 1203, whereby relay hammer contact 1204 will touch relay base contact 1205 connecting the electrical circuit, energizing fan motor 108 and effectively turning cooler 101 on.

If the user chooses, function buttons 503 can be used to control cooler 101 manually. By pressing function buttons 503, time-clock will transmit a PLC signal to on/off module 303 or high/low module 302, actuating or releasing the desired relay section 1202, connecting or breaking the electrical circuit, and effectively controlling cooler 101.

Keychain Remote 601 and Transceiver 701

The user of keychain remote 601 and transceiver 701, turns fan 107 on and off and from high to low by pressing keychain remote buttons 602 (a, b, c, & d), much in the way function buttons 503 of time-clock 501 is used to control cooler 101 manually. Typical use would be for the fan to be on when the user goes to bed. While the user is falling asleep, their body will be cooling down and cooler 101 can be shut off just before they dose off to sleep. If during the night, cooler 101 is desired to be turned on, a simple press of will turn cooler 101 on without having the user get out of bed to get to the wall switch. Upon pressing remote button 602a, keychain remote 601 sends a radio frequency (RF) signal to transceiver 701 which in turn sends PLC a signal over the building's electrical wiring 307 which in turn triggers on/off module 303 or high/low module 302, thereby controlling cooler 101.

Remote Thermostat 801

The user of remote thermostat 801 would choose the location for the device and plug it into an electrical outlet 306. The desired temperature set-point and motor speed would be set. Remote thermostat 801 would then transmit PLC signals to on/off module 303 based on the inside air temperature it senses and the set-point, cycling cooler 101 on and off.

Remote Setback Thermostat 901

The user of remote setback thermostat 901 would choose the location for the device and plug it into an electrical outlet 306. The desired temperature set-point, motor speed, and time-of-day would be set. Cooler 101 would then cycle on and off based on the inside air temperature, time-of-day and set-point.

Telephone Transponder 1001

The user of telephone transponder 1001 would plug it into an electrical outlet 306 and a telephone outlet. The user would make a telephone call to the building and transmit signals to transponder 1001 over the phone lines using the telephone keypad. Transponder 1001 would relay the signals to the control devices thereby controlling cooler 101. If the user chooses, function buttons 1003 can be used to control cooler 101 manually.

Computer Interface 1101

The user of computer interface 1101 would plug it into an electrical outlet 306 and a port of a computer. Appropriate software would be installed into the computer and programmed. The computer would trigger the control devices and therefore control cooler 101.

Typical Use

The user sets the switches on new control switch 301 by setting the position of pump selection switch 304 to PUMP ON WITH FAN, and setting the position of fan motor selection switch 305 to REMOTE. The remote control devices are plugged into electrical outlets in the building and the desired on/off times or temperatures are set. As an example, time-clock 501 would be plugged into an electrical outlet 306 of the building in a desirable location such as on the bedside nightstand. The current time and desired on/off times would be set. As an example, time-clock 501 would be set to turn the cooler on at 3:00 PM and off at 1:30 AM. At 3:00 PM, time-clock 501 will send a PLC signal over the building's electrical wiring 307 acting as what was referred to as a transmitter in the above Pat. No. 4,200.862 to Campbell. On/off module 303 will be listening for this PLC signal and will act as what was referred to as a slave unit in the above Pat. No. 4,200.862 to Campbell, by recognizing the signal in module control section 1201, in turn energizing the coil in module relay section 1202. This actuates the relay by pivoting relay hammer 1203, whereby relay hammer contact 1204 will touch relay base contact 1205 connecting the electrical circuit. Electrical power would then flow from building circuit breaker box 118, through building hot wire 115a, through switch hot wire 116d, through fan motor selection switch 305, through relay hammer 1203, relay hammer contact 1204 and relay base contact 1205 of on/off module 303, through pump selection switch 304, through switch pump wire 116a and switch on/off wire 116b, through relay hammer 1203, relay hammer contact 1204 and relay base contact 1205 of high/low module 302, through pump fuse 202c and motor high fuse 202a or motor low fuse 202b, depending on the setting of high/low module 302, through motor outlet 203 and pump outlet 204, energizing motor 108 and pump 105. The cooler will then operate and cool the building a few hours before the occupants arrive. At 1:30 AM, time-clock 501 would send a PLC signal over the building's power wires. On/off module 303 would receive this signal and release its relay, disconnecting the electrical power to the motor and pump. The cooler will then shut off automatically preventing the building and occupants from getting cold during the night.

As a second example, keychain remote transceiver 701 would be plugged into an electrical outlet 306 of the building and its antenna 703 is raised. Batteries would be put into keychain remote control 601. Assuming the cooler was running with fan motor 108 on low speed, when the user presses remote high button 602c, keychain remote control 601 will send a radio frequency (RF) signal to transceiver 701 which in turn sends PLC a signal over the building's electrical wiring 307 which in turn triggers high/low module 302 which diverts the electrical power current from passing through motor low fuse 202b to motor high fuse 202a, thereby changing motor 108 from running on low speed to running on high speed. The cooler can be controlled with keychain remote control 601 at any location of the building within radio frequency range of transceiver 701. Multiples of keychain remote controls 601 as well as other remote control devices can be used. For example, one keychain remote control 601 can be located on an end table in a family room, where other remote controls such as those for a television are located, while a second keychain remote control 601 can be located in a bedroom, adding a great deal of convenience for the occupants.

Advantages

Advantages of this system include energy and water savings. Evaporative cooler blower fans are generally driven by ⅓, ½, ¾ or 1 HP motors. If run continuously, these motors will draw about 430, 580, 820, or 950 kWh per month, respectively, which will cost about 40, 50, 70, or 80 dollars per month respectively. Evaporative coolers can have a high water usage on the order of 15–20 gallons (55–75 liters) per hour. Shutting off an evaporative cooler can cause a building to become hot and take a few hours to cool down after turning the cooler back on. Presently, it is common for occupants to run their evaporative cooler continuously to prevent having a hot house. Many of these people would gladly or even prefer to shut their cooler off during unneeded periods, if an appropriate controller was available to them. The controller would turn the cooler on and cool the building down before the occupants returned. Shutting cooler 101 off when it is not needed or at times when the building is not occupied can result in significant savings of water and electrical energy.

Installation is relatively easy. High/low module 302 is a small box with five electrical leads that is wired into electrical disconnect box 114 with wire nuts or other acceptable connection methods. New control switch 301 is about the size of a standard electric switch plate, has four electrical leads, and directly replaces the existing control switch.

Pump switch 304 and motor switch 305 on new control switch are set. One or more remote control devices such as time-clock 501, transceiver 701, thermostat 801, setback thermostat 901, telephone transponder 1001, or computer interface 1101 are plugged into any standard electrical outlet 306 of the building and the system is put into operation.

Installation does not require any additional wiring or construction. It can be performed by anyone with basic electrical wiring skills and can follow electrical wiring installation instructions.

The control for cooler 101 can be located anywhere in the building. Locating the control at bedside can add a great deal of convenience and improve comfort of the building's occupants.

Fan motor 108 will never be run at high and low speeds simultaneously which could have potentially damaged motor 108.

This system can be operated manually, which is beneficial in the event of failure of the added control devices.

This system adds comfort to the building by adding time-of day, or temperature control.

Telephone transponder 1001 allows the user to control the cooler from outside the building. For example, if the user's plans change or there is a change in the weather, the user can call transponder 1001, control the cooler, and have the building comfortable upon arrival.

A combination of devices could be used. As an example, the user could control the cooler with keychain remote 601 while time-clock 501 is operational.

Conclusion, Ramifications, and Scope

This remote control system for evaporative coolers comprises the addition of devices to allow control from multiple locations and with controllers such as time-clock 501, thermostat 801, setback thermostat 901, telephone transponder 1001, and computer interface 1101. This not only improves comfort of the building's occupants, but also can reduce energy and water usage. It is relatively easy to install and cost effective.

This system uses remote location signal transmission such as PLC technology to trigger control devices added to an existing evaporative cooler control system. The function of existing wires is changed which is a critical concept required to power the necessary control devices without requiring additional building wires. These concepts have yet to be discovered as evidenced by the prior-art.

Being able to control the cooler in multiple locations enables bedside control. Not having to get out of bed to control of the cooler, adds a great deal and an unexpected amount of convenience. This is an advantage that was never before appreciated. The remote control feature allows the cooler to be controlled at the cooler location, which is often on the roof. This adds a great deal of convenience during maintenance and is an unexpected result. The combination of the different technical fields of evaporative cooler controls and PLC electronics has never been considered in the prior-art.

While the above description contains many specificities, these should not be construed as limitations on the scope of the invention, but rather as an exemplification of one preferred embodiment thereof. Many other variations are possible. For example, other remote control devices could be used with this system such as occupancy sensors, control by verbal commands, or by sound commands such as hand clapping. High/low module 302 could be located on motor wire 112 inside cooler 101 instead of inside electrical disconnect box 114, with the necessary wiring modifications, to allow for easier installation. Remote keychain transceiver 701 could be permanently mounting inside new control switch 301, inside electrical disconnect box 114, or inside an electric switch box. The control devices such as time-clock 501 could be made to transmit their signals to transceiver 701, much in the way keychain remote control 601 transmits its signals, and not be plugged into an electric outlet. Time-clock 501 could have a 7-day or monthly program. Time-clock 501 could have multiple on and off cycles. A third remotely triggered module could be added to control pump 105. A delay circuit could be included to energize pump 105 a few minutes before energizing motor 108 to pre-wet pads 103. This system could be used on coolers that are not roof-mounted. The remote control devices could include relative-time control, for example to turn the cooler on after a two-hour delay. A combination of remote control devices could be incorporated into a single device. For example, time-clock 501 and telephone transponder 1001 could be made into one device. Other systems could be used to transmit and receive signals instead of PLC, such as radio frequency, radar, infrared, visible light, laser, or ultrasonic.

Accordingly, the scope of the invention should be determined not by the embodiment illustrated, but by the appended claims and their legal equivalents.

We claim:

1. A system for controlling the operation of an evaporative cooler of the type having a plurality of cooler pads, a cooling liquid reservoir, a pump having a motor for circulating cooling liquid from said reservoir onto said cooler pads, a blower fan having a motor with a plurality of speeds for drawing outside air through said cooler pads and for discharging it into an air duct distribution system, an electrical disconnect, a control switch, and wires connecting a main power source with said electrical disconnect and said control switch, said system comprising:

a. a control device selected from the group consisting of thermostats, time clocks, manual switches, occupancy sensors, telephone transponders, and computer interfaces, b. a signal transmitter for transmitting a signal using a technology selected from the group consisting of power line carrier, radio frequency, radar, infrared, visible light, laser, and ultrasonic, c. a receiver for said signal, d. a switching device for coupling and uncoupling said motors of said pump and said fan from said power source, e. a switching device for changing speeds of said fan motor, whereby a signal from said control device can be transmitted from a multitude of locations and received by said switching devices thereby energizing, de-energizing, and changing speeds of said fan and pump motors and no additional wires are required.

2. A system for controlling the operation of an evaporative cooler, said system comprising:

a. a switching means for coupling and uncoupling said pump and fan motors from said power source, and b. a switching means for changing speeds of said fan motor, whereby said switching means can be triggered from a multitude of locations away from the switching means and no additional wires are required.

3. The control system of claim 2 wherein said switching means is responsive to a signal transmitting means selected from the group consisting of power line carrier, radio frequency, radar, infrared, visible light, laser, and ultrasonic, whereby said switching means can be triggered upon receipt of a signal transmitted from a multitude of locations away from the switching means and no additional wires are required.

4. The switching means of claim 3 wherein said signal transmitting means is operated by control means selected from the group consisting of temperature, time-of-day, manual actuation, occupancy, telephone signals, and computer signals, whereby said switching means can be automated or operated manually.

5. The time-of-day control means of claim 4 wherein said signal is transmitted based on absolute time-of-day, as an example, 4:15 p.m.

6. The time-of-day control means of claim 4 wherein said signal is transmitted based on relative time-of-day, as an example, in two hours from now.

7. The switching means of claim 2 wherein said switching means is comprised of a means for receiving said signal and a means for coupling or uncoupling said pump and fan motors from said power source.

8. The switching means of claim 2 wherein said switching means is comprised of a means for receiving said signal and a means for changing speeds of said fan motor.

9. A method for controlling the operation of an evaporative cooler, comprising the steps of:

a. initiating a control signal upon an event selected from the group consisting of reaching a temperature threshold, reaching a predetermined time-of-day, the actuation of a manual switch, the sensing of occupancy, the receipt of a command transmitted by telephone, and the receipt of a command from a computer, b. transmitting said control signal using a technology selected from the group consisting of power line carrier, radio frequency, radar, infrared, visible light, laser, and ultrasonic, c. receiving said control signal, d. actuating a switching device, e. coupling or uncoupling said pump and fan motors from said power source, and f. changing speeds of said fan motor, whereby an automated or manual command from a multitude of locations will energize, de-energize, and change speeds of said fan and pump motors and no additional wires are required.

* * * * *